Patented Nov. 2, 1943

2,333,548

UNITED STATES PATENT OFFICE 2,333,548

PROCESS FOR PRODUCING TETRA HYDROXYPHENYL ALKANES

Joseph B. Niederl, Brooklyn, N. Y.

No Drawing. Application May 8, 1940,
Serial No. 333,997

3 Claims. (Cl. 260—619)

This invention relates to processes of producing certain polyphenolic alkanes and as well to such products as new compounds. More particularly it relates to the production of tetra hydroxyphenyl alkanes containing three or more carbon atoms in the alkyl chain, and also to the said products themselves.

Tetra hydroxyphenyl methane and tetra hydroxyphenyl ethane are known to the prior art and no novelty thereto is claimed herein. The novelty of the instant invention resides primarily in a new process which though not capable of producing the methane and ethane derivatives is excellently adapted for the production of novel alkane derivatives of higher molecular weight. These new alkanes possess valuable properties either not possessed, or possessed to a lesser degree, by the previously known phenyl alkanes.

In a preferred embodiment of the invention, tetra hydroxyphenyl alkanes or alkyl-tetraphenols are prepared by condensing diketones with phenolic compounds. In general, the process involves condensing the phenolic component with the ketone in the presence of an inorganic acidic catalyst, one mol equivalent of the ketonic dioxo-compounds being condensed with at least four mol equivalents of the phenolic compound, which proportion amounts to two mols of said phenolic compound for every carbonyl group present. The carbonyl groups are preferably in alpha, beta or gamma positions. Typical examples of such ketones are: diacetyl, acetylacetone, and diacetone. One mol equivalent of any of these diketones can be condensed in accordance with the instant invention, with four mol equivalents of phenol or of ortho substituted phenols and will yield the respective tetra hydroxyphenyl-butane, or -pentane or -hexane. Other aliphatic diketonic carbonyl compounds containing up to eighteen or more carbon atoms may be used to produce their corresponding tetrahydroxyphenyl derivatives.

In its broader aspects, the present invention is not limited to reactions employing diketones, but extends to processes reacting other polycarbonyl compounds of the general formula,

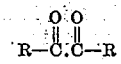

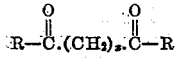

and

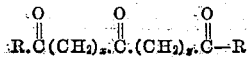

in which R represents an aliphatic radical and $x$ and $y$ are whole numbers of one or more. The resulting compounds have the formula

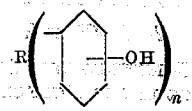

where $n$ is at least 4 and R is an aliphatic radical, more particularly, a di-, tri- or tetra alkylidene radical of three, four or more carbon atoms.

The phenolic compound condensed with these carbonyl compounds in the processes of the instant invention may be any benzenoid compound having a free hydroxyl group attached to a benzene ring. The ring should have free nuclear hydrogen atoms meta and para to the hydroxy group. Phenol itself, as well as its ortho alkylated homologues, such as o-cresol and o-ethyl-phenol, guaiacol, vic. xylenol, or alpha naphthol may be used for condensation with the diketones to yield the respective tetra hydroxyphenyl alkanes or alkylidenes.

The condensation reactions of the instant invention are preferably performed in the presence of a strong mineral acid catalyst, such as hydrochloric, sulfuric or phosphoric acid, although acid-producing and acid-hydrolyzing compounds can be used such as, for instance, the halides of boron, for example, boron trifluoride, and of aluminum, for example, aluminum chloride. Sulfuric acid and hydrogen chloride either in the form of a gas or as aqueous solutions have proven to give excellent results. In some instances, improved results are obtained when the acids are employed in the presence of glacial acetic acid.

The condensation reaction of the present invention can be performed by mixing the reagents and then adding the acid catalyst to the mixture. Appropriate inert solvents, such as acetic and propionic acid, may be used advantageously in facilitating some of the reactions. The condensations normally take place at room temperature, but mild heat treatments to about 50° C. sometimes are desirable.

The novel compounds of the present invention may be used in the production of plastic materials. They also are especially of value as intermediates in the synthesis of various other compounds such as dyestuffs, biochemicals, pharmaceuticals, and the like.

The following examples are included in order that the invention may be clearly understood, but they are not to be interpreted as a limitation upon the scope of the invention.

EXAMPLE 1

Alpha Diketone Condensations Using Diacetyl and Phenol

Diacetyl and phenol in the molar proportions of one to four are mixed together, and to the mixture there are added fifty cubic centimeters of glacial acetic acid for each gram molecular weight of the mixture to form a solution of the phenol. For a period of about two hours dry hydrogen chloride gas is introduced into the resulting mixture or solution near the bottom of the mass. The reaction mass is then allowed to stand at room temperature in a sealed container until the mass becomes highly viscous. Next, the mass is poured into water, whereupon a viscous oil separates out. Being phenolic in nature, the oil is soluble in aqueous alkalis or Claisen solution, which consists of equal parts of methanol and a 50% aqueous solution of potassium hydroxide. If so desired, the condensation product can be purified by acetylation and hydrolysis of the resulting acetate, in the conventional manner.

EXAMPLE 2

Beta Diketone Condensations Using Acetylacetone and Phenol (a) Fifty cubic centimeters of glacial acetic acid are added to one mol of acetylacetone and four mols of phenol to solubilize the mixture. The mixture is placed in an appropriate reaction vessel such as a round-bottomed flask provided with a reflux condenser and a gas inlet tube reaching to the bottom of the vessel. Dry hydrogen chloride gas is thereafter introduced into the mixture for a period of two hours. Subsequently the reaction mass is allowed to stand at room temperature until it becomes very viscous. The hydrochloric acid is then removed by pouring the resulting mass into water and separating the resulting acid solution. If further purification is desired, the material is washed repeatedly with dilute sodium carbonate solution. As in Example 1, it can also be purified by preparing its acetate, followed by hydrolysis.

(b) A mixture consisting of one mol of acetylacetone and four mols of phenol is saturated with dry hydrogen chloride gas in an appropriate reaction chamber. The reaction vessel is then closed with a stopper and allowed to stand for a period of two weeks, after which the reaction mixture is completely solid. Thereafter the solid mass is washed first with water, and then with a dilute solution of sodium carbonate. Further purification of the tetra hydroxyphenyl reaction product can be achieved by preparing its acetyl derivative and subsequently hydrolyzing this derivative.

EXAMPLE 3

Gamma Diketone Condensations

1. *Using acetonylacetone and phenol*

(a) A mixture consisting of four mols of phenol and one mol of acetonylacetone

(CH₃COCH₂CH₂COCH₃)

is saturated with dry hydrogen chloride gas at room temperature for six hours and the resulting mass is allowed to stand for three weeks when solidification usually occurs. This mass is then placed on porous tile, or other suitable adsorbent, and permitted to remain until the particles are free from any adhering liquid. At this stage, the crystals are preferably recrystallized from a 95% alcohol solution. The purified crystals are insoluble in water, but are soluble in Claisen solution, from which they are not precipitated upon dilution with water. The melting point of the crystals is 298° C. (uncorrected). The reaction compound forms a crystalline acetyl derivative which melts at 186° C. and an octa nitro derivative decomposing at 300° C.

(b) A mixture consisting of four mols of phenol, one mol of acetonylacetone, and fifty cubic centimeters of glacial acetic acid is introduced into a flask and hydrogen chloride gas is passed into the flask for a period of two hours. Subsequent to the introduction of the hydrogen chloride, the flask is sealed with a stopper and allowed to stand for three weeks. During this period, the entire reaction mass becomes solid. The purification of the crystals is carried out as in example a above.

(c) Concentrated hydrochloric acid is added to a mixture consisting of four mols of phenol and one mol of acetonylacetone in a sufficient quantity to effect a solution. The reaction solution is then set aside. After three days crystals usually begin to form, and after a week the reaction mass usually becomes a solid. The isolation and purification of the crystals may be accomplished in the same manner described in examples a and b above.

2. *Using acetonylacetone and o-cresol*

(a) A mixture consisting of four mols of o-cresol and one mol of acetonylacetone is saturated with dry hydrogen chloride gas. The reaction mixture is allowed to stand for two weeks, during which period the mass usually solidifies. This mass is then placed on porous tile or some other suitable adsorbent and permitted to remain until the particles are free from any adhering liquid. The material is preferably crystallized from a 95% alcohol solution. The purified crystals are insoluble in water, but are soluble in Claisen solution, from which they are not precipitated upon dilution with water. The melting point of the purified crystals is 104° C. (uncorrected). The compound also forms a crystalline acetyl derivative which melts at 103° C. (uncorrected).

(b) A mixture consisting of four mols of o-cresol, one mol of acetonylacetone and fifty cubic centimeters of glacial acetic acid is introduced into a round-bottomed flask provided with a reflux condenser and a gas inlet tube which reaches to the bottom of the vessel. Hydrogen chloride gas is then passed into this flask for two hours. The flask is then closed with a stopper and allowed to stand for three weeks, at the expiration of which the entire reaction mass is solid. The purification of the crystals is carried out as in example a above.

3. *Using acetonylacetone and alpha-naphthol*

To a mixture consisting of four mols of alpha-naphthol and one mol of acetonylacetone

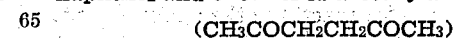

(CH₃COCH₂CH₂COCH₃)

enough glacial acetic acid is added to effect solution upon moderate warming. Into this solution, which is contained in a suitable round bottomed flask provided with a reflux condenser and a gas inlet tube reaching nearly to the bottom of the flask, dry hydrogen chloride gas is introduced until the mixture is completely saturated with the gaseous condensing agent. The mixture is then set aside for three weeks and thereafter treated with cold water to remove the water soluble acids and any unreacted ketone. Thereupon the remaining tar-like mass is treated with an aqueous sodium hydroxide solution. The resulting reaction product, the 2,2,5,5-tetra(alpha-hydroxy)-naphthyl-hexane is a water insoluble sodium salt which precipitates out, while any unreacted alpha-naphthol goes into solution. The free tetra-naphthol compound is obtained by acidifying the sodium salt with a mineral acid. This acidulation might more conveniently be done in alcoholic solution, since the sodium salt of the tetra-naphthol is somewhat soluble in ethyl alcohol. The tetra-naphthol is then purified by reprecipitation with water from its alcoholic solution and is finally crystallized from dilute alcohol. When the purified compound is heated it decomposes instead of melting. It forms an acetate upon treatment with acetic acid anhydride. It can be diazotized, also, giving intensely colored products.

It should be understood that the invention is not limited to the specific reagents, reaction conditions and reaction products set out herein, but that it extends to all equivalent materials and procedures which will occur to those skilled in the art upon consideration of the scope of the appended claims.

I claim:

1. A 2,2,5,5 - tetrakis - (4' - hydroxyphenyl) - hexane.

2. A poly hydroxyaryl hexane, 2,2,5,5-(4'-hydroxyaryl) - hexane, wherein the hydroxyaryl radicals are selected from the class consisting of hydroxynaphthyl, hydroxyphenyl and ortho alkylated hydroxyphenyl radicals.

3. A poly hydroxyphenyl hexane, 2,2,5,5-(4'-hydroxy-3'-methylphenyl)-hexane.

JOSEPH B. NIEDERL.